P. BAUER AND B. J. FITZSIMMONS.
BOLT.
APPLICATION FILED APR. 20, 1920.
1,367,763.
Patented Feb. 8, 1921.
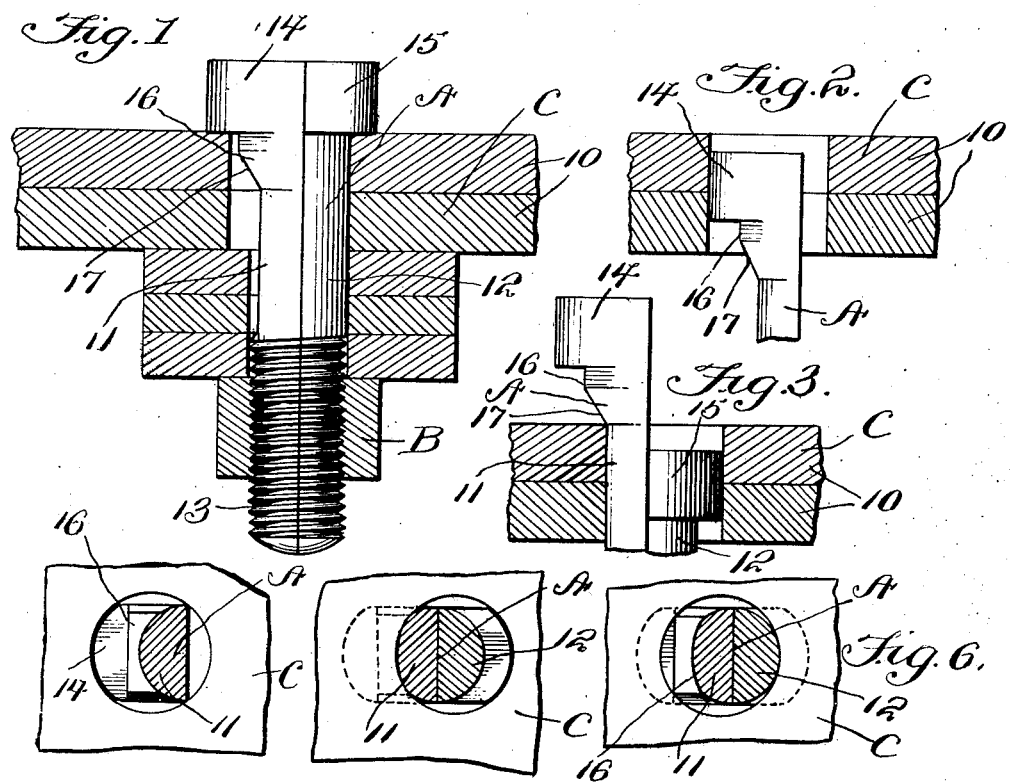
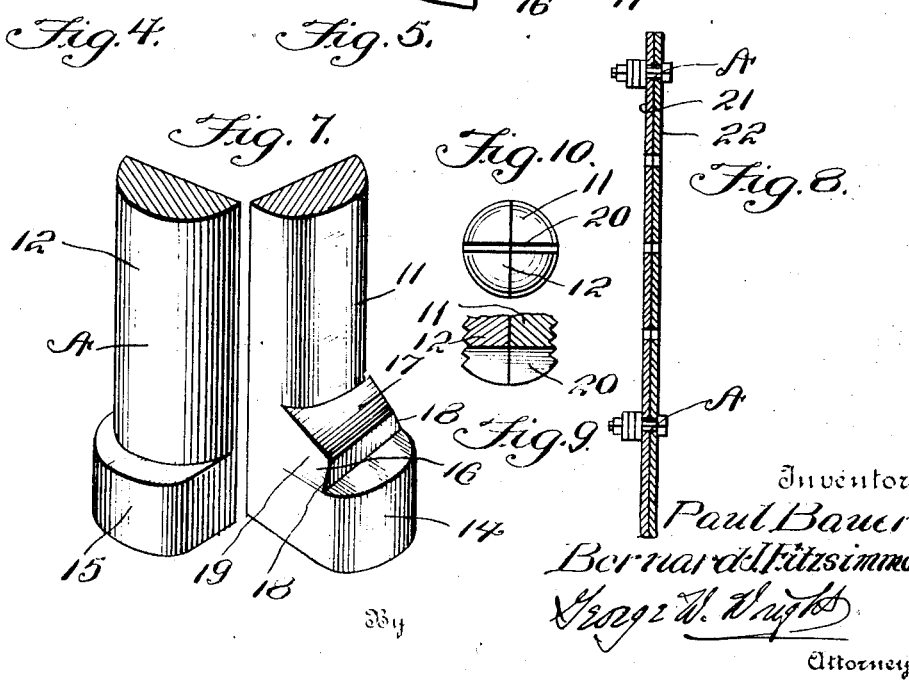
Inventor
Paul Bauer
Bernard J. Fitzsimmons
George W. Wright
Attorney

UNITED STATES PATENT OFFICE.

PAUL BAUER AND BERNARD J. FITZSIMMONS, OF BALTIMORE, MARYLAND.

BOLT.

1,367,763.        Specification of Letters Patent.        Patented Feb. 8, 1921.

Application filed April 20, 1920. Serial No. 375,2..

*To all whom it may concern:*

Be it known that we, PAUL BAUER and BERNARD J. FITZSIMMONS, citizens of the United States, residing at Baltimore, in the State of Maryland, have invented certain new and useful Improvements in Bolts, of which the following is a specification.

This invention relates to fastening elements and the primary object of the invention is to provide an improved bolt, which is especially adapted for use in holding ship plates in position, while the same are being riveted in place, but which is susceptible for other uses.

In ship building, an ordinary nut and bolt is used for temporarily holding plates or the like in position while the same are being riveted in place, which requires the services of two men, one on the outside for sticking the bolts through the apertures and one on the inside for threading the nuts on the bolts. The riveters follow the nut and bolt men and when several rivets have been placed in position, the nuts are removed and the riveter pushes the bolts through the holes and permits the same to drop promiscuously on the ground and be lost. Thus in the method it can be seen that, one, the services of two men is required for positioning the bolts in place, and as one is on one side and one on the other side they often become separated which causes loss of time and confusion; that two, the bolts are lost after being used once, and that three, serious accidents often occur by the bolts dropping on workmen below. It is therefore another object of the invention to provide an improved bolt which can be placed in position from one side and which can be readily removed from the same side, thereby producing a bolt which can be repeatedly used and which will eliminate all accidents, and which will dispense with the services of one of the bolt and nut men.

A further object of the invention is the provision of a two part bolt, the parts of which can be readily placed through an opening and which are constructed in such a manner that when the same are drawn together and moved into operative position in the opening the movement thereof through the opening is prevented.

A further object of the invention is to provide an improved two part bolt, which is adapted to be used in places where it is impossible to insert a bolt from one side and place the nut on from the opposite side and which is so constructed that the parts of the bolt are forced into tighter operative position as the nut is tightened.

A further object of the invention is to provide an improved two part bolt, which is prevented from slipping around in the opening, as the nut is advanced, thereby obviating the necessity of holding the head of the bolt with wrenches and the like.

A still further object of the invention is to provide an improved bolt of the above character which is durable and efficient in use, one that is simple and easy to manufacture, and one which can be placed upon the market at a reasonable cost.

With these and other objects in view, the invention consists of the novel construction, arrangement and formation of parts as will be hereinafter more fully described, claimed and illustrated in the accompanying drawings, forming a part of this specification and in which drawings:

Figure 1 is an elevation of the improved bolt showing the same in operative engagement with the work, the work and nut being shown in section.

Fig. 2 is a fragmentary side elevation of one of the bolt sections being placed in position in the work, the work being shown in section.

Fig. 3 is a similar view showing both of the sections being placed in position in the work prior to the same being moved into operative position.

Fig. 4 is a cross section through one of the bolt sections being placed in position.

Fig. 5 is a cross section through the bolt section showing the same being moved into operative position.

Fig. 6 is a similar view showing the sections in operative position.

Fig. 7 is a perspective view of the bolt sections.

Fig. 8 is a fragmentary cross section through the skin of a vessel showing the bolts holding the plates temporarily in position.

Fig. 9 is a fragmentary longitudinal section through the bolt.

Fig. 10 is an end elevation of the bolt.

Referring to the drawings, in detail, wherein similar reference characters designate corresponding parts throughout the several views, the letter A indicates the improved bolt, B the nut, and C the work engaged by the nut and bolt, which as shown is a pair of plates 10.

The improved bolt A includes the companion sections 11 and 12, each of which are substantially semi-circular in cross section and provided with threads 13. The section 11 is provided with a head 14, which projects laterally from one side thereof, as clearly shown in the drawings. The section 12 is also provided with a head 15, which projects laterally therefrom in a direction opposite to the head 14. The section 11 directly below the head 14 is provided upon its outer portion or side with a shifting and holding enlargement 16, which is gradually tapered or beveled toward the shank of the section 11 as at 17, for a purpose which will hereinafter more fully appear. The ends of the enlargement 16 defines sharp cutting teeth or biting edges 18, which are adapted to engage the inner surface of apertures formed in the work at opposite sides thereof to prevent rotation of the bolt therein. The teeth or biting edges 18 are also gradually inclined on opposite sides as at 19.

In operation of the improved bolt A, the section 11 is inserted head first through the aperture in the work C and the enlargement 16 thereof is held beyond the aperture after which the section 12 is inserted head first through the apertures. The sections are then brought together and drawn inwardly, which moves the inclined face 17 of the enlargement in engagement with the wall of the apertures and forces the heads 14 and 15 in position. As the heads 14 and 15 are drawn into position the teeth or biting edges 18, owing to the inclined face thereof, will be drawn into tight engagement with the opposite portions of the walls of the aperture and thus positively prevent accidental rotation of the bolt. The nut C which is of the usual construction is then threaded in place in the ordinary manner.

The section 11 has its outer surface lying between the threads and the beveled portions 17 reduced and cut inwardly of the threaded portion thereof, so as to permit the section 11 to be moved farther over in the apertures, to permit of the ready placing of the other section in place.

In Figs. 9 and 10 is illustrated a slightly modified form of the bolt A in which the ends thereof opposite to the heads is provided with a cross slot 20, for the reception of the bit of a screw driver, which may be used for holding the bolt against rotation, while the nut is being threaded in position.

In Fig. 8 is illustrated the bolts A holding plates 21 and 22 in position, while the same are being riveted in place.

From the foregoing description it can be seen that an improved bolt is provided which can be readily inserted or withdrawn from the same side on which the nut is placed on or removed.

Changes in details may be made without departing from the spirit or scope of the claims, but;

We claim:

1. A bolt comprising longitudinal sections, each section embodying a shank provided with a head extending laterally beyond the same and also having screw-threads, and a shifting enlargement formed upon one section forwardly of the head, said enlargement projecting laterally beyond the shank for a substantial distance and terminating inwardly of the edge of the head, said enlargement serving to shift the shank inwardly and positively hold the same in the inner position.

2. A bolt comprising longitudinal sections, each section embodying a shank provided with a head extending lateraly beyond the same and also having screw-threads, and a shifting enlargement formed upon the outer portion of one section forwardly of the head, said enlargement projecting laterally beyond the shank for a substantial distance and terminating inwardly of the edge of the head, said shifting enlargement embodying an inclined face, and being adapted to move the shank laterally and inwardly and to positively hold the same in the inner position.

3. A bolt comprising longitudinal sections, each section embodying a shank provided with a head extending laterally beyond the same and also having screw-threads, one shank being provided upon its outer portion forwardly of its head with a recess formed therein, and a shifting enlargement arranged between the recess and head and secured to said shank, said enlargement extending laterally beyond the shank and embodying an inclined face.

4. A bolt comprising longitudinal sections, embodying shanks having straight inner contacting faces, each shank carrying a head projecting laterally beyond the same, and one shank being provided upon its outer portion with a shifting enlargement, extending laterally beyond the shank.

5. A bolt mechanism comprising a pair of interfitting sections, each section including a substantially semicylindrical shank and a laterally projecting head, an enlargement formed on the shank of one section arranged to engage in the bore of the work which the bolt is associated with, and biting teeth formed on the shank at opposite spaced points arranged to engage the bore of the work.

6. A bolt comprising longitudinal sections, each section embodying a shank provided with a head extending laterally beyond the same and also having screw-threads, one shank being provided upon its outer portion forwardly of the head and near the same with a holding enlargement, said enlargement projecting laterally beyond the shank for a substantial distance, said enlargement serving to positively hold its shank in an inner position spaced from the wall of the opening of the bolt when the bolt is drawn forwardly so that the head of the same is in the inner position.

PAUL BAUER.
BERNARD J. FITZSIMMONS.